United States Patent
Kuno et al.

(10) Patent No.: US 12,222,724 B2
(45) Date of Patent: Feb. 11, 2025

(54) MOBILE BODY CONTROL DEVICE, MOBILE BODY CONTROL PROGRAM, AND MOBILE BODY

(71) Applicants: AISIN CORPORATION, Kariya (JP); KEIO UNIVERSITY, Tokyo (JP)

(72) Inventors: Kazuhiro Kuno, Kariya (JP); Yutaka Watanabe, Kariya (JP); Masaki Takahashi, Yokohama (JP); Ayanori Yorozu, Yokohama (JP); Shunichi Sekiguchi, Yokohama (JP)

(73) Assignees: AISIN CORPORATION, Kariya (JP); KEIO UNIVERSITY, Tokyo (JP)

( * ) Notice: Subject to any disclaimer, the term of this patent is extended or adjusted under 35 U.S.C. 154(b) by 264 days.

(21) Appl. No.: 17/797,740

(22) PCT Filed: Mar. 31, 2021

(86) PCT No.: PCT/JP2021/014011
§ 371 (c)(1),
(2) Date: Aug. 5, 2022

(87) PCT Pub. No.: WO2021/201163
PCT Pub. Date: Oct. 7, 2021

(65) Prior Publication Data
US 2023/0082797 A1    Mar. 16, 2023

(30) Foreign Application Priority Data

Mar. 31, 2020    (JP) .................................. 2020-064336

(51) Int. Cl.
*G05D 1/00*    (2024.01)

(52) U.S. Cl.
CPC .................................. *G05D 1/0217* (2013.01)

(58) Field of Classification Search
CPC ..... G05D 1/0217; G05D 1/0212; G05D 1/024
(Continued)

(56) References Cited

U.S. PATENT DOCUMENTS

| 11,409,295 B1* | 8/2022 | Samdaria | G05D 1/0217 |
| 2006/0106496 A1* | 5/2006 | Okamoto | G05D 1/0278 |
| | | | 700/255 |

(Continued)

FOREIGN PATENT DOCUMENTS

JP    2008-234404 A    10/2008

*Primary Examiner* — Tiffany P Young
*Assistant Examiner* — Ashleigh Nicole Turnbaugh
(74) *Attorney, Agent, or Firm* — Oliff PLC (57) ABSTRACT

A mobile body control device includes: an observation trajectory acquisition unit that acquires, a trajectory along which the subject walks; a basic trajectory acquisition unit that acquires, a basic trajectory that matches the observation trajectory; a subject predicted trajectory acquisition unit that acquires a trajectory along which the subject walks after the current time point based on the specific basic trajectory; a prediction reliability calculation unit that calculates a prediction reliability based on uncertainty added along the subject predicted trajectory; a target trajectory acquisition unit that acquires, a trajectory formed by a target position of a mobile body set ahead of the subject in a traveling direction of the subject; and a control-command-sequence-generating unit that generates a control command sequence using an evaluation function that uses as input the subject predicted trajectory, prediction reliability, target trajectory, and a control trajectory.

6 Claims, 8 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2017/0357264 A1* | 12/2017 | Watanabe | G01C 21/3626 |
| 2020/0139967 A1* | 5/2020 | Beller | G05D 1/81 |
| 2021/0200230 A1* | 7/2021 | Ross | G05D 1/0088 |

* cited by examiner

(Experimental conditions for learning basic trajectory)

Simulation conditions

| Number of steps of target predicted trajectory | 20 (1.3 s) |
|---|---|
| Number of steps of observation trajectory | 7 (0.46 s) |
| Maximum acceleration | 1.67 m/s$^2$ |
| Maximum angular acceleration | 100 deg/s$^2$ |
| Maximum speed | 1.67 m/s |
| Maximum angular speed | 180 deg/s |

FIG.7B

| Evaluation indices | |
|---|---|
| $TE_p$ | Mean target following error |
| $D_n$ | Robot traveling distance |
| $T_{uncomfort}$ | Out-of-proper-range time |

MOBILE BODY CONTROL DEVICE, MOBILE BODY CONTROL PROGRAM, AND MOBILE BODY

TECHNICAL FIELD

The present disclosure relates to a mobile body control device, a mobile body control program, and a mobile body.

BACKGROUND ART

There are known various control methods for controlling a robot to move accompanying; a walker at a position ahead of the walker. For example, Patent Document 1 discloses a mobile robot that follows a subject while maintaining a predetermined relative position obliquely ahead of the subject, in which a target position of the mobile robot is determined in accordance with the direction of the subject detected by means of a camera or the like.

CITATION LIST

Patent Document

Patent Document 1: JP 2008-234404A

DISCLOSURE OF THE INVENTION

Problems to be Solved by the Invention

As described above, in the mobile robot disclosed in Patent Document 1, a target position of the mobile robot is determined in accordance with the direction of the subject detected by means of a camera or the like. However, the direction of the target detected by means of a camera or the like includes an error, and the subject direction cannot be detected accurately at the time when the subject turns or changes direction, thus making it difficult to adequately determine the target position of the mobile robot.

The present disclosure has been made in view of the above situation, and an object thereof is to provide a mobile body control device, a mobile body control program, and a mobile body capable of adequately moving a mobile body such that it accompanies a subject according to the walking state of the target and a mobile body.

Means for Solving the Problems

The present disclosure has been made to solve the above problem, and a mobile body control device according to an embodiment of the present disclosure is a device that controls a moving unit of a mobile body such that the mobile body moves accompanying a subject at a position ahead of the subject in a traveling direction thereof and includes: a subject information acquisition unit that acquires subject information including the position and traveling direction of the subject; an observation trajectory acquisition unit that processes the subject information in time-series order to acquire, as an observation trajectory, a trajectory along which the subject has walked until the current time point; a basic trajectory acquisition unit that acquires, from a plurality of basic trajectories which are trajectories along which a walker walks toward a plurality of different target points, each of the basic trajectories being added, along its trajectory, with an uncertainty that represents probability distribution deviating from the trajectory, a specific basic trajectory that matches the observation trajectory; a subject predicted trajectory acquisition unit that acquires from the specific basic trajectory, as a subject predicted trajectory, a trajectory along which the subject walks after the current time point so as to follow the observation trajectory; a prediction reliability calculation unit that calculates, based on the uncertainty added along the subject predicted trajectory, prediction reliability of prediction that the subject walks following the subject predicted trajectory along the subject predicted trajectory; a target trajectory acquisition unit that acquires, as a target trajectory, a trajectory formed by a target position of the mobile body set ahead of the subject in the traveling direction when it is assumed that the subject walks following the subject predicted trajectory; a control-command-sequence-generating unit that generates a control command sequence using an evaluation function that uses as input the subject predicted trajectory, prediction reliability, target trajectory, and a control trajectory obtained when the mobile body moves according to the control command sequence output to the moving unit in time-series order; and a movement control unit that controls the moving unit based on the control command sequence.

A mobile body control program according to the embodiment of the present disclosure allows a computer to function as the mobile body control device.

A mobile body according to the embodiment of the present disclosure includes the mobile body control device.

Advantageous Effects of the Invention

According to the mobile body control device, mobile body control program, and mobile body of the embodiment of the present embodiment, the observation trajectory acquisition unit acquires, as the observation trajectory, a trajectory along which the subject has walked until the current time point, the basic trajectory acquisition unit acquires, as the specific basic trajectory, a basic trajectory matching the observation trajectory from the plurality of basic trajectories added with the uncertainty, the subject predicted trajectory acquisition unit acquires from the specific basic trajectory, as the subject predicted trajectory, a trajectory along which the subject walks after the current time point so as to follow the observation trajectory, the prediction reliability calculation unit calculates, based on the uncertainty added along the subject predicted trajectory, prediction reliability of prediction that the subject walks following the subject predicted trajectory along the subject predicted trajectory, the target trajectory acquisition unit acquires, as the target trajectory, a trajectory formed by the target position of the mobile body set ahead of the subject in the traveling direction when it is assumed that the subject walks following the subject predicted trajectory, the control-command-sequence-generating unit generates the control command sequence using the evaluation function that uses as input the subject predicted trajectory, prediction reliability, target trajectory, and control trajectory obtained when the mobile body moves according to the control command sequence output to the moving unit in time-series order, and the movement control unit controls the moving unit of the mobile body based on the control command sequence.

The evaluation function that the control-command-sequence-generating unit uses to generate the control command sequence takes the prediction reliability of prediction that the subject walks following the subject predicted trajectory, so that accompanying movement of the mobile body is controlled in accordance with the level of the prediction reliability. Thus, the mobile body control device can adequately move the mobile body such that it accompanies the subject according to various walking states of the subject.

BRIEF DESCRIPTION OF THE DRAWINGS

FIGS. 1A and 1B illustrate an example of a mobile body 1 (robot R) according to an embodiment of the present disclosure, in which FIG. 1A is a front view and FIG. 1B is a plan view;

FIGS. 7A to 7C illustrate the outline of simulation, in which FIG. 7A illustrates simulation conditions, FIG. 7B illustrates evaluation indices, and FIG. 7C illustrates a proper range; and FIGS. 8A and 8B illustrate simulation analysis results, in which FIG. 8A illustrates comparison results of the evaluation indices, and FIG. 8B illustrates comparison result of the control trajectories.

BEST MODE FOR CARRYING OUT THE INVENTION

Hereinafter, an embodiment of the present disclosure will be described with reference to the accompanying drawings.

Figure 1A:
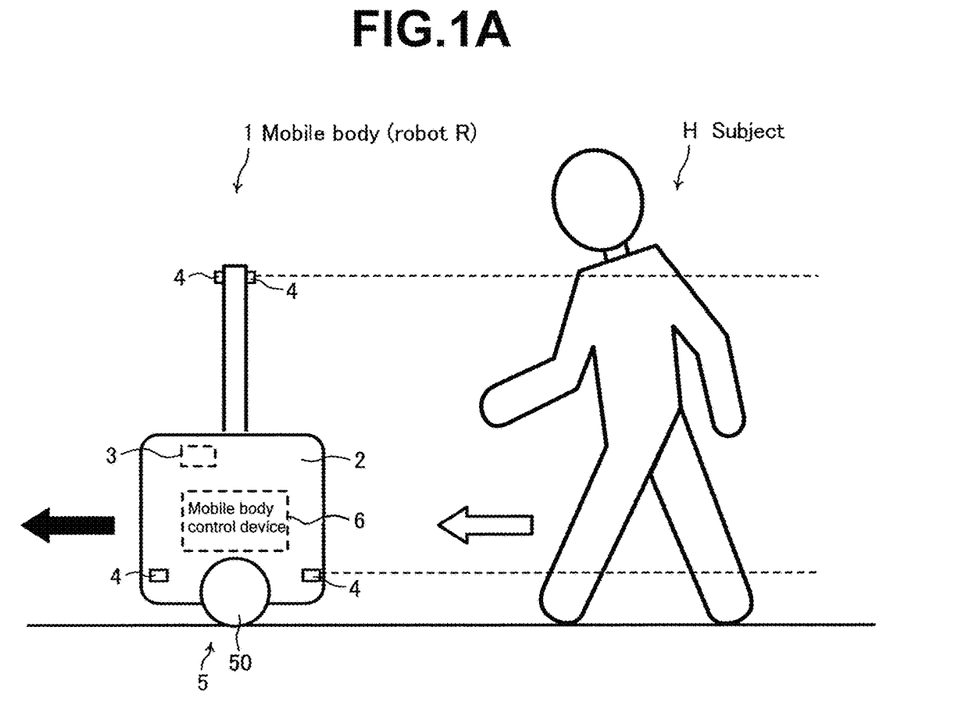
Figure 1B:
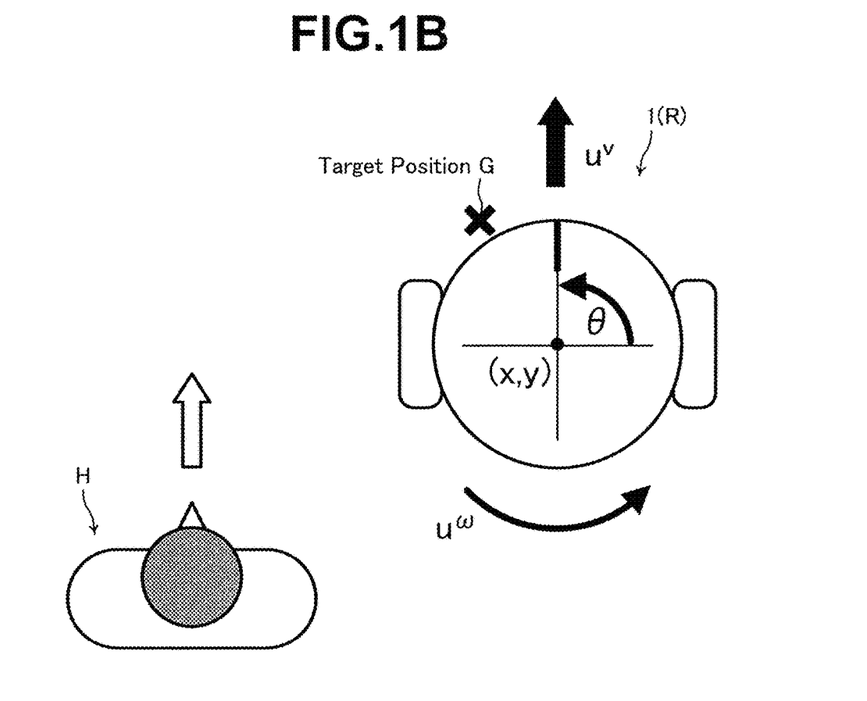
Figure 2:
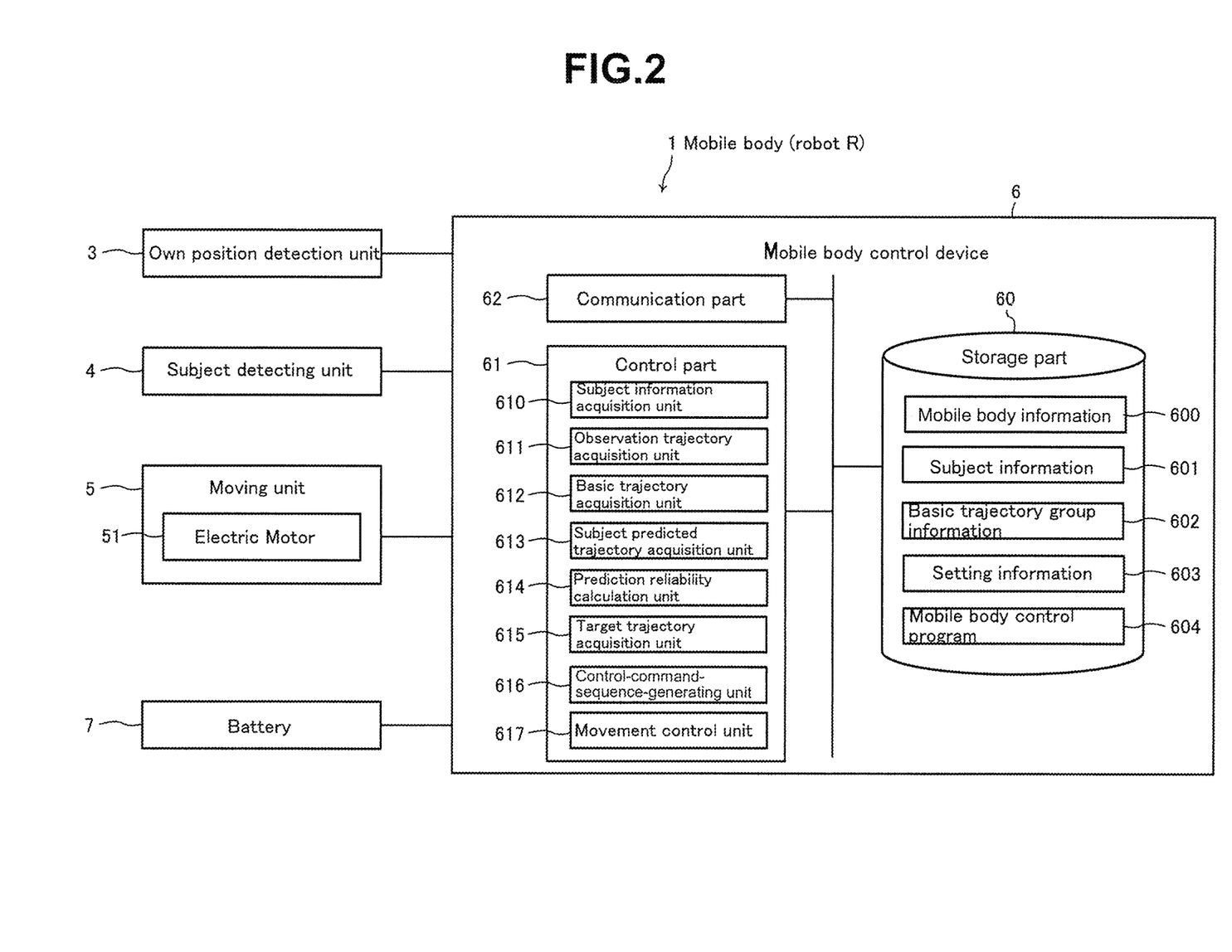
FIG. 2 is a block diagram illustrating an example of the mobile body 1 (robot R) according to the embodiment of the present disclosure.

FIGS. 1A and 1B illustrate an example of a mobile body 1 (robot R) according to the embodiment of the present disclosure. FIG. 1A is a front view and FIG. 1B is a plan view. FIG. 2 is a block diagram illustrating an example of the mobile body 1 (robot R) according to the embodiment of the present disclosure.

The mobile body 1 is constituted as a self-traveling robot R and configured to move while sequentially updating a target position G set ahead of a subject H in a traveling direction thereof according to the walking state (speed or direction) of the subject H to accompany the subject H. The mobile body 1 may be used for any purpose such as industrial use, commercial use, housed use, medical use, disaster relief purpose, and research purpose. The mobile body 1 can be used indoor and outdoor.

In the present embodiment, description will be made assuming that the mobile body 1 is a self-traveling robot R, as illustrated in FIG. 1. For example, the robot R includes a columnar-shaped main body 2, an own position detection unit 3 that detects the current position (own position) and attitude (traveling direction) of the mobile body 1 (robot R), subject detection units 4 that detect a subject H existing around the robot R, a moving unit 5 that moves the robot R in the front, rear, left, and right directions, a mobile body control device 6 that is incorporated in the main body 2 and performs mobile body control processing (mobile body control method) to control each of the above units of the robot R, and a power supply 7 that supplies power to the units of the robot R.

The own position detection unit 3 is constituted by, for example, a GPS sensor or a position estimating sensor (rotation angular speed sensor for a wheel 50) based on dead reckoning and configured to detect the own position and traveling direction of the robot R at a predetermined detection period and to send the detection result to the mobile body control device 6. The own position detection unit 3 may detect the own position of the robot R by receiving position information from position transmitters (not illustrated) installed at predetermined positions in the environment or may be a unit obtained by combining the above plurality of components.

The subject detection units 4 are each constituted by, for example, a distance measuring sensor, such as a laser range senor or a millimeter wave sensor and are attached to portions of the mobile body 1 almost corresponding to the shoulder and ankle of the subject H. The subject detection unit 4 emits laser light millimeter waves in all directions (360°) at a predetermined detection period and measures the time taken for reflected light or reflected waves to return from the subject H existing in a detection range 40 to thereby detect the relative position (distance or orientation) of the subject H with respect to the robot R. Further, the subject detection unit 4 observes the shape of the shoulder, motion of the foot, or the like to detect the traveling direction of the subject H. Then, the detection results are sent to the mobile body control device 6 at a predetermined detection period. The subject detection unit 4 may be constituted by a camera, an ultrasonic wave sensor, an infrared ray sensor, or the like, or may be one obtained by combining the above plurality of components. Further, the subject detection unit 4 may additionally have a function of detecting another mobile body 1, another subject, and obstacles.

The moving unit 5 includes plurality of wheels 50 and a plurality of electric motors 51 that receives power from the power supply 7 and drives the plurality of wheels 50 into rotation. The moving unit 5 controls the number of rotations or torque of the electric motors 51 based on a control command received from the mobile body control device 6 to thereby change a translation motion $U^V$ when the robot R moves forward or backward and change an angular speed $U^\omega$ when the robot R turns. In the moving unit 5, in order to achieve turning of the robot R, a difference in the number of rotations may be set between left and right wheels 50, or a steering function that changes the recti on of a front wheel 50 may be provided.

The mobile body control device 6 sends a control command to the moving unit 5 based on the detection result of the own position received from the own position detection unit 3 and detection result of the subject H received from the subject detection unit 4 to control the robot R such that it moves accompanying the subject H at a position ahead of the subject H while maintaining a predetermined distance from the subject H.

In the present embodiment, it is assumed that the mobile body control device 6 controls the moving unit configured as an independent two-wheel drive type by using a kinetics model defined by a state equation expressed by the following equation (1). Therefore, the mobile body control device 6 outputs a control command U=(translation motion $U^V$, angular speed $U^\omega$) to the moving unit 5 every predetermined control period Δt to thereby control the position. (x, y) and traveling direction θ.

[Numeral 1]

$$X_{k+1}^r = \begin{bmatrix} x_{k+1}^r \\ y_{k+1}^r \\ \theta_{k+1}^r \end{bmatrix} = \begin{bmatrix} \cos(\theta_k^r) & 0 \\ \sin(\theta_k^r) & 0 \\ 0 & 1 \end{bmatrix} \begin{bmatrix} u_k^v \\ u_k^\omega \end{bmatrix} \Delta t + X_k^r \quad (1)$$

As a specific configuration, the mobile body control device 6 includes, as illustrated in FIG. 2, a storage part 60 constituted by an HDD, an SDD, a ROM, a RAM and the like and configured to store various information, a control part 61 constituted by a processor such as a CPU and configured to perform various computations, and a communication part 62 as a communication interface with external devices (including, for example, infrastructure equipment, a centralized management device, another mobile body, a mobile terminal owned by the subject H).

The storage part 60 stores mobile body information 600 including the position and traveling direction of the robot R, subject information 601 including the position and traveling direction of the subject H, basic trajectory group information 602 including information related to a plurality of basic trajectories, setting information 603 including various coefficients, conditions, and calculation formulas required for calculating an evaluation value J (details of which will be described later), and a mobile body control program 604.

The position and traveling direction of the robot R included in the mobile body information 600 are information obtained accumulating, in time-series order, the detection results (position and traveling direction of the robot R) for a predetermined time period from the past time point to the current time point detected by the own position detection unit 3 at a predetermined detection period. When a new detection result is sent from the own position detection unit 3, current information is sequentially updated.

The position and traveling direction of the subject H included in the subject information 601 are information obtained by accumulating, in time-series order, the detection results (position and traveling direction of the subject H) for a predetermined time period from the past point to the current point detected by the subject detection unit 4 at a predetermined detection period. When a new detection result is sent from the subject detection unit 4, current information is sequentially updated.

Figure 3:
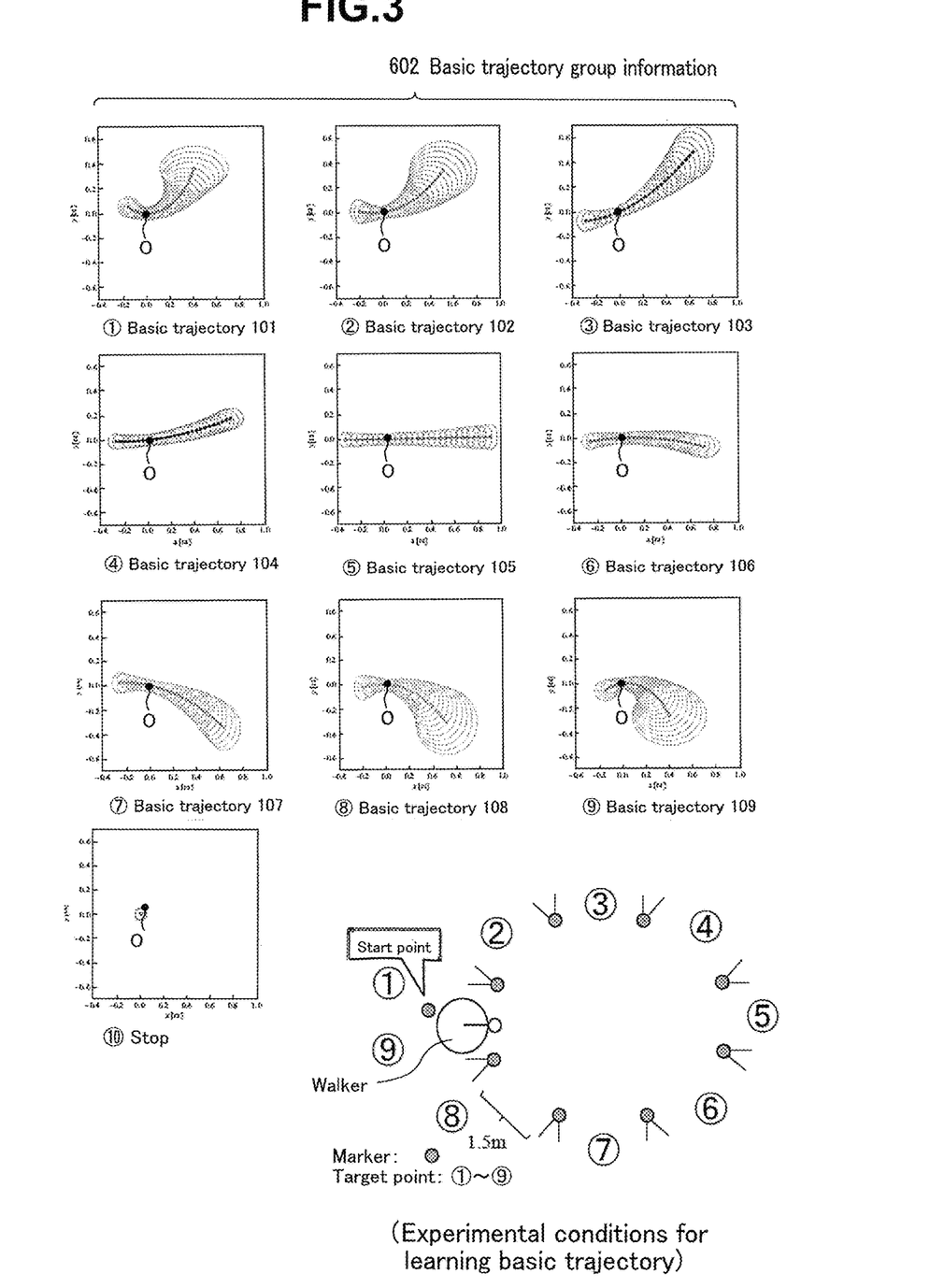
FIG. 3 is a view illustrating an example of a plurality of basic trajectories 101 to 109 included in basic trajectory group information 602.

FIG. 3 is a view illustrating an example of the plurality of basic trajectories 101 to 109 included in the basic trajectory group information 602.

The basic trajectory group information 602 is information obtained by learning the plurality of basic trajectories of a walker walking toward a plurality of different target points (in the example of FIG. 3, nine target points 1 to 9 from a start position) in previous experiments.

For example, trajectories along which each of a plurality of walkers walks from a start point to target point 1 to 9 are measured using various sensors plurality of times and are then statistically processed to generate the shapes (solid lines in FIG. 3) of the basic trajectories 101 to 109 toward the target points 1 to 9. For example, the basic trajectories 101 to 109 are generated as dot sequence data obtained by arranging, in time-series order, the positions and traveling directions of the walker at respective time points. Then, when the position of an origin O is regarded as, for example, the current position, the trajectory on the left side of the origin O is defined as the trajectory from the past time point until the current time point, and the trajectory on the right side of the origin O is defined as the trajectory from the current time point until the future time point.

When trajectories obtained when the subjects H walk toward the same target point are compared, there is a difference (variation) between the plurality of subjects H, and further, even the same walker has a difference (variation) in trajectory between first and second measurement times. Thus, probability distribution deviating from each of the basic trajectories 101 to 109 is represented as an uncertainty (entropy) using, for example, Gaussian distribution, whereby the uncertainty (elliptical part in FIG. 3) is added along the shape (solid line in FIG. 3) of each of the basic trajectories 101 to 109.

In each of the basic trajectories 101 to 109 illustrated in FIG. 3, the uncertainty at each time point is represented as an ellipse corresponding to a range of two times the standard deviation. In the basic trajectories 101 to 109, the higher the turning angle of the basic trajectory is, the larger the uncertainty is set therefor. For example, the basic trajectories 101 and 109 corresponding to U-turn and basic trajectories 102 and 108 corresponding to abrupt turning have a large uncertainty (ellipse). Further, in the basic trajectories 101 to 109, the more the time axis in the basic trajectory advances, the larger the uncertainty is set for the basic trajectory. For example, the uncertainty (ellipse) becomes larger toward the right from the origin O. Although the basic trajectories 101 to 109 illustrated in FIG. 3 are related to the position (x-coordinate and y-coordinate), the basic trajectory group information 602 further has basic trajectories 101 to 109 (not illustrated) related to the traveling direction θ which is treated similar to the x-coordinate and y-coordinate.

As illustrated in FIG. 2, the control part 61 executes the mobile body control program 604 to function as a subject information acquisition unit 610, an observation trajectory acquisition unit 611, a basic trajectory acquisition unit 612, a subject predicted trajectory acquisition unit 613, a prediction reliability calculation unit 614, a target trajectory acquisition unit 615, a control-command-sequence-generating unit 616, and a movement control unit 617.

Figure 4:
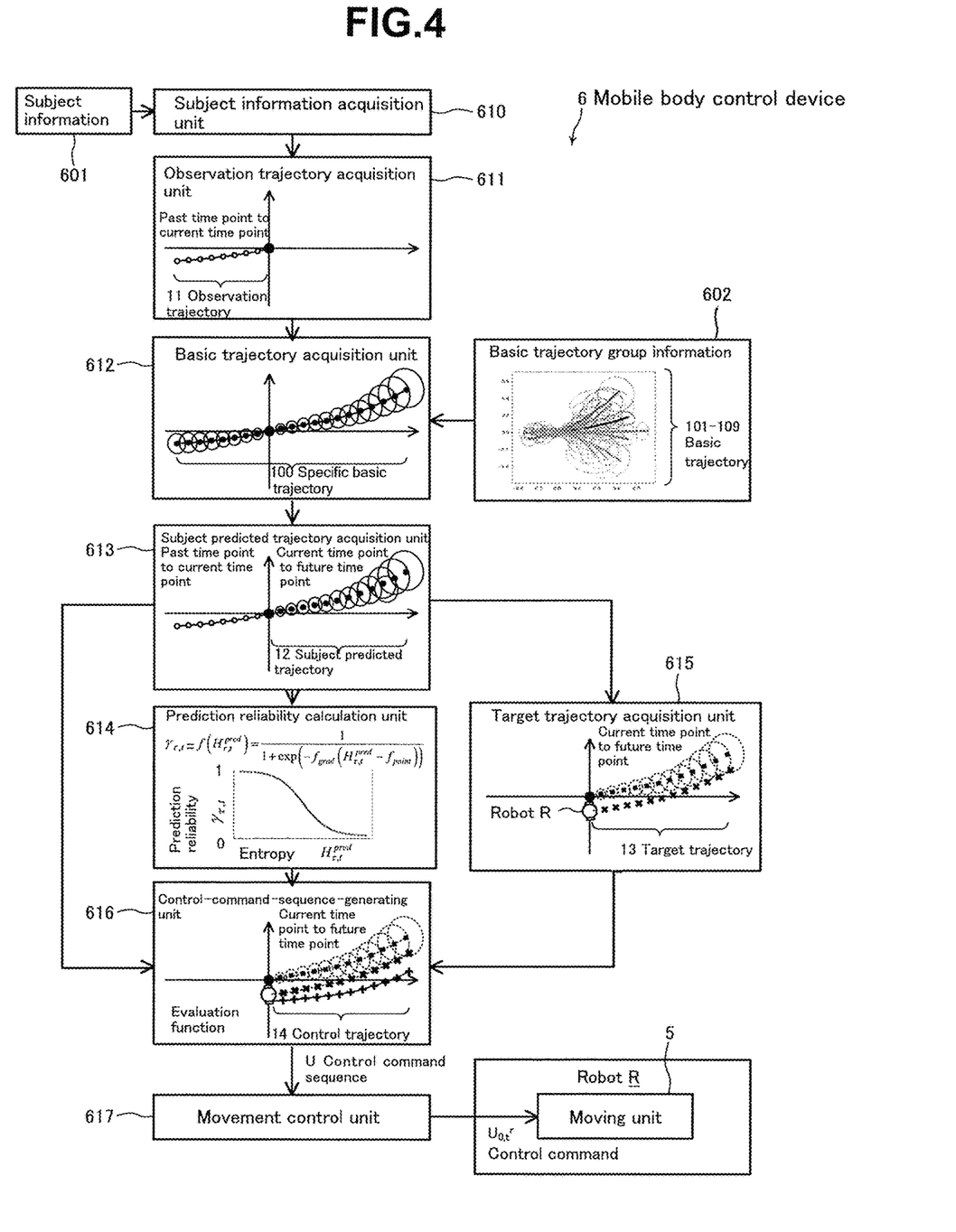
FIG. 4 is a functional block diagram illustrating an example of a mobile body control device 6 according to the embodiment of the present disclosure.

FIG. 4 is a functional block diagram illustrating an example of the mobile body control device 6 according to the embodiment of the present disclosure.

The subject information acquisition unit 610 reads out the subject information 601 including the position and traveling direction of the subject H from the storage part 60 to acquire the subject information 601. The subject information acquisition unit 610 may acquire the subject information 601 directly from the subject detection unit 4.

The observation trajectory acquisition unit 611 processes the subject information 601 in time-series order to acquire, as an observation trajectory 11, a trajectory along which the subject H has walked until the current time point. The observation trajectory 11 is dot sequence data obtained by arranging, in time-series order, the positions and traveling directions of the subject H at respective time points, which are measured by the subject detection unit 4 at a predetermined detection period.

The basic trajectory acquisition unit 612 acquires, as a specific basic trajectory 100, a basic trajectory matching the observation trajectory 11 from the plural of basic trajectories 101 to 109 included in the basic trajectory group information 602. Specifically, the basic trajectory acquisition unit 612 calculates a matching degree between the plurality of basic trajectories 101 to 109 and observation trajectory 11 and synthesizes a plurality of basic trajectory based on the matching degree with respect to each observation trajectory 11 to thereby acquire the specific basic trajectory 100.

Figure 5:
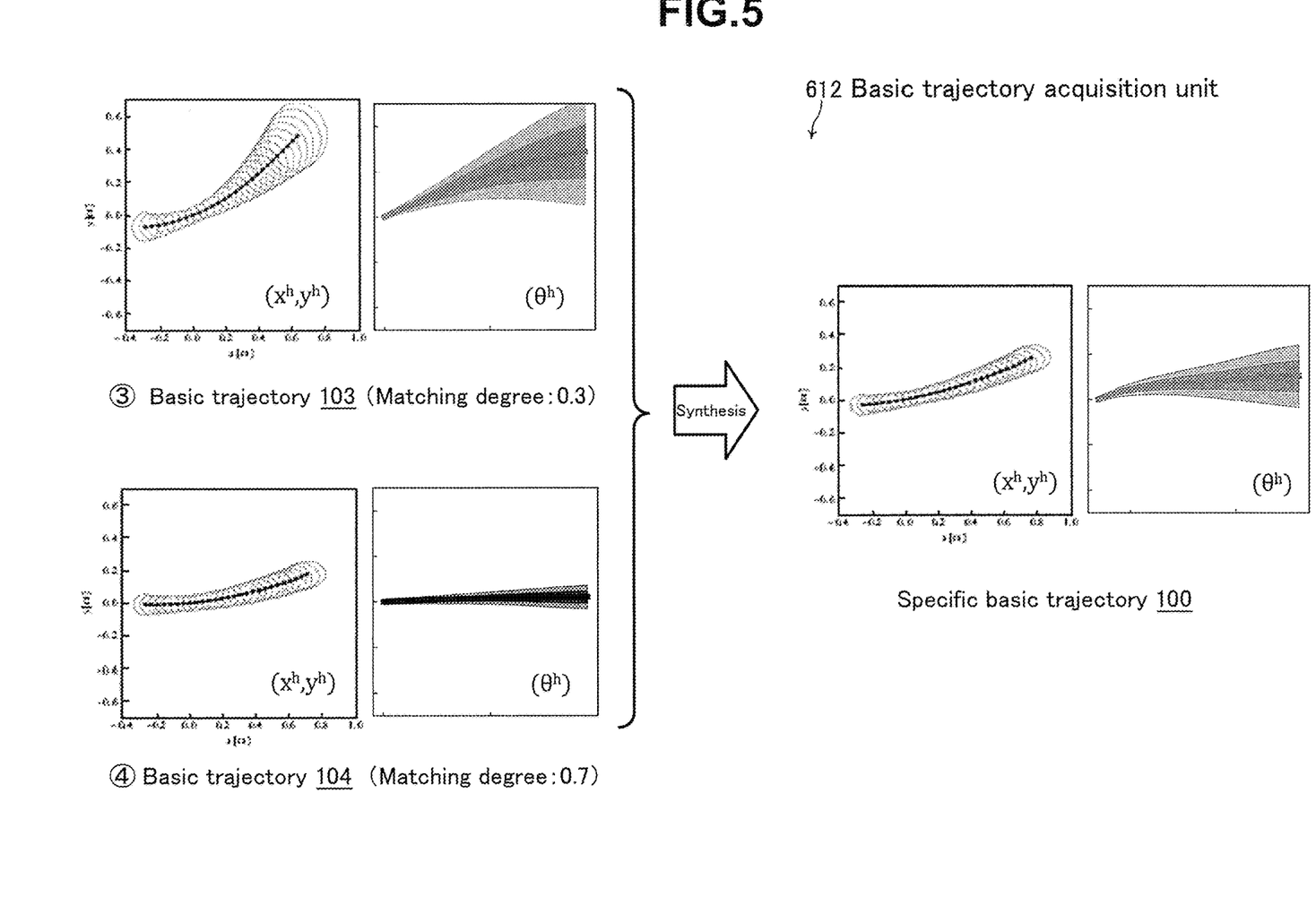
FIG. 5 is a view illustrating an example of a specific basic trajectory 100 synthesized from basic trajectories 103 and 104.

FIG. 5 is a view illustrating an example of the specific basic trajectory 100 synthesized from the basic trajectories 103 and 104. FIG. 5 illustrates not only the basic trajectories 103 and 104 related to the position (x-coordinate and y-coordinate) but also those related to the traveling direction θ.

The matching degree is calculated in a value range between 0 and 1, which is an index value increasing as similarity between the shape of the observation trajectory 11 along which the subject H has walked until the current time point and the shape (shape from the past time point and current time point) of each of the basic trajectories 101 to 109 until the origin O becomes higher. FIG. 5 illustrates a case where the basic trajectory acquisition unit 612 calculates, for example, a matching degree of "0.3" for the basic trajectory 103 and calculates a matching degree of "0.7" for the basic trajectory 104. In this case, the basic trajectories 103 and 104 are synthesized in a ratio of "3:7" to acquire the specific basic trajectory 100. Thus, even when the observation trajectory 11 is an unknown trajectory that is not included in the basic trajectory group information 602, a specific basic trajectory 100 matching the observation trajectory 11 can be acquired from the known basic trajectories 101 to 109.

The subject predicted trajectory acquisition unit 613 acquires from the specific basic trajectory 100, as a subject predicted trajectory 12, a trajectory along which the subject H walks after the current time point so as to follow the observation trajectory 11.

The prediction reliability calculation unit 614 calculates, based on the uncertainty (entropy) added along the subject predicted trajectory 12, prediction reliability γ of prediction that the subject H walks following the subject predicted trajectory 12 along the subject predicted trajectory 12.

The prediction reliability calculation unit 614 applies a sigmoid function to the uncertainty (ellipse size) added to each dot along the subject predicted trajectory 12 as shown by the following equation (2) to calculate the prediction reliability γ in a range between 0 and 1. The prediction reliability γ is an index value having a larger value with a smaller uncertainty.

[Numeral 2]

$$\gamma_{\tau,t} = f(H_{\tau,t}^{pred}) = \frac{1}{1 + \exp(-f_{grad}(H_{\tau,t}^{pred} - f_{point}))} \quad (2)$$

When it is assumed that the subject H walks following the subject predicted trajectory 12, the target trajectory acquisition unit 615 acquires, as a target trajectory 13, a trajectory formed by the target position G of the robot R set ahead of the subject H in the traveling direction.

For example, when one of the front left and front right can be selected as the target position G of the robot R, the target trajectory acquisition unit 615 selects the front left or front right of the subject H in the traveling direction based on the mobile body information 600 including the position and traveling direction of the robot R and subject information 601 and acquires, as the target trajectory 13, a trajectory formed by the selected target position G. The target position G is, for example, 45° to the left or 45° to the right with respect to the traveling direction of the subject H and is set at a position of 0.85 m from the subject H. The target trajectory 13 in the example of FIG. 4 is one formed by the target position G set in the front right of the subject H in the traveling direction.

The control-command-sequence-generating unit 616 generates a control command sequence U using an evaluation function that uses as input the subject predicted trajectory 12, prediction reliability γ, target trajectory 13, and a control trajectory 14 obtained when the robot R moves according to the control command sequence U output to the moving unit 5 in time-series order. The control command sequence U and control trajectory 14 are specified by the kinetics equation shown in the above equation (1).

The evaluation function is defined by the following equation (3), and the control-command-sequence-generating unit 616 generates the control command sequence U so as to minimize an evaluation value $J_t$ calculated by the evaluation function.

[Numeral 3]

$$\min_{U_{0,t}^r, \ldots, U_{T_{pred}-1,t}^r} J_t = \quad (3)$$

$$\gamma_{T_{pred},t}\left(J_{T_{pred},t}^{goal}\right) + \sum_{k=0}^{T_{pred}-1}\left[J_{\tau,t}^{control} + \gamma_{\tau,t}\left(J_{\tau,t}^{goal} + J_{\tau,t}^{obs}\right)\right]$$

where,
subject predicted trajectory: $X_{0,t}^h, \ldots, X_{T_{pred},t}^h$
prediction reliability γ: $\gamma_{0,t}, \ldots, \gamma_{T_{pred},t}$
target trajectory: $X_{0,t}^g, \ldots, X_{T_{pred},t}^g$
control trajectory: $X_{1,t}^r, \ldots, X_{T_{pred},t}^r$
control command sequence: $U_{0,t}^r, \ldots, U_{T_{pred}-1,t}^r$
control penalty term:

$$J_{\tau,t}^{control} = \frac{1}{2} U_{\tau,t}^{r\,T} R U_{\tau,t}^r$$

target penalty term:

$$J_{T_{pred},t}^{goal} = E\left[\frac{1}{2} X_{T_{pred},t}^{diff\,T} S_f X_{T_{pred},t}^{diff}\right]$$

$$X^{diff} = X^r - X^g$$

subject penalty term:

$$J_{\tau,t}^{obs} = E\left[\omega_o \exp\left(-\frac{d_{\tau,t}^{rk}}{2\sigma_o^2}\right)\right]$$

$$d^{rh} = \sqrt{(x^h - x^r)^2 - (y^h - y^r)^2}$$

Figure 6:
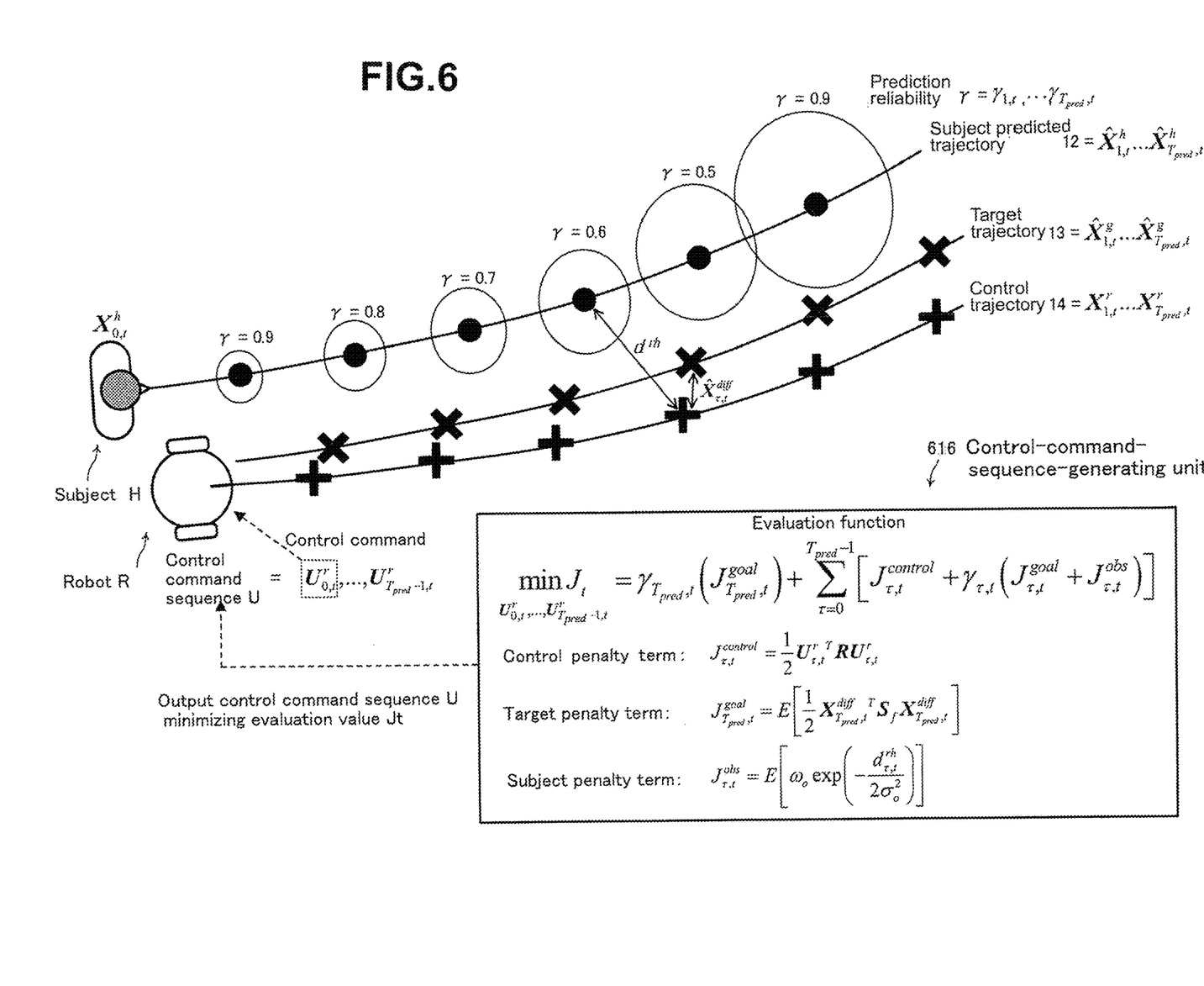
FIG. 6 is a schematic view illustrating the relation between a subject predicted trajectory 12, prediction reliability γ, a target trajectory 13, a control trajectory 14, and a control command sequence U.

FIG. 6 is a schematic view illustrating the relation between the subject predicted trajectory 12, prediction reliability γ, target trajectory 13, control trajectory 14, and control command sequence U.

As shown by the above equation (3), the evaluation function adds a control penalty term for the control command sequence U, a subject penalty term based on the distance between the subject predicted trajectory 12 and control trajectory 14, and a target penalty term based on the distance between the target trajectory 13 and control trajectory 14 and multiplies the prediction reliability γ as a coefficient with the subject penalty term and target penalty term to thereby calculate the evaluation value $J_t$.

The control penalty term is a penalty for a temporal variation of the control command in the control command sequence U. For example, when the control command included in the control command sequence U indicates abrupt acceleration/deceleration or abrupt turning, the value (penalty) of the control penalty term increases, whereas when the control command indicates a movement in which the temporal variation in the translational speed or angular speed is small, the value (penalty) of the control penalty term reduces.

The subject penalty term is a penalty for the distance between the subject predicted trajectory 12 and control trajectory 14. For example, when the distance from the subject H reduces to such a degree that the robot R contacts the subject H or distance from the subject H becomes significantly large, the value (penalty) of the subject penalty term increases, whereas when the distance from the subject H is maintained at a predetermined range, the value (penalty) of the subject penalty term reduces.

The target penalty term is a penalty for the distance between the target trajectory 13 and control trajectory 14. For example, as the distance from the target position G increases, the value (penalty) of the target penalty term increases, whereas as the distance from the target position G reduces, the value (penalty) of the target penalty term reduces.

The movement control unit 617 controls the moving unit 5 based on the control command sequence U. That is, the movement control unit 617 outputs the latest control command $U_{0,t}{}^r$ included in the control command sequence U to the moving unit 5 to control the moving unit 5.

As described above, according no the mobile body control device 6, mobile body control program 604, and mobile body 1 of the present embodiment, the observation trajectory acquisition unit 611 acquires, as the observation trajectory 11, a trajectory along the subject H has walked until the current time point, the basic trajectory acquisition unit 612 acquires, as the specific basic trajectory 100, a basic trajectory matching the observation trajectory 11 from the plurality of basic trajectories 101 to 109 added with the uncertainty, the subject predicted trajectory acquisition unit 613 acquires from the specific basic trajectory 100, as the subject predicted trajectory 12, a trajectory along which the subject H walks after the current time point so as to follow the observation trajectory 11, the prediction reliability calculation unit 614 calculates, based on the uncertainty (entropy) added along the subject predicted trajectory 12, prediction reliability γ of prediction that the subject H walks following the subject predicted trajectory 12 along the subject predicted trajectory 12, the target trajectory acquisition unit 615 acquires, as the target trajectory 13, a trajectory formed by the target position G of the mobile body set ahead of the subject H in the traveling direction when it is assumed that the subject H walks following the subject predicted trajectory 12, the control-command-sequence-generating unit 616 generates the control command sequence U using the evaluation function that uses as input the subject predicted trajectory 12, prediction reliability γ, target trajectory 13, and control trajectory 14 obtained when the mobile body 1 moves according to the control command sequence U output to the moving unit 5 in time-series order, and the movement control unit 617 controls the moving unit 5 of the mobile body 1 based on the control command sequence U.

The evaluation function that the control-command-sequence-generating unit 616 uses to generate the control command sequence U takes the prediction reliability γ of prediction that the subject H walks following the subject predicted trajectory 12, so that accompanying movement of the mobile body 1 is controlled in accordance with the level of the prediction reliability γ. Thus, the mobile body control device 6 can adequately move the mobile body 1 such that it accompanies the subject H according to various walking states of the subject H by executing the mobile body control processing (mobile body control method) illustrated in the functional block diagram of FIG. 4 every predetermined control period Δt without previous preparation of complicated control patterns or control rules.

The evaluation function used at this time adds the control penalty term for the control command sequence U, subject penalty term based on the distance between the subject predicted trajectory 12 and control trajectory 14, and target penalty term based on the distance between the target trajectory 13 and control trajectory 14 and multiplies the prediction reliability γ as a coefficient with the subject penalty term and target penalty term to thereby calculate the evaluation value $J_t$.

Therefore, in calculating the evaluation value $J_t$, the weight of the penalty of the subject penalty term and target penalty term multiplied with the prediction reliability γ as a coefficient varies when the prediction reliability γ is high and when the prediction reliability γ is low. For example, when the prediction reliability γ is low, the subject penalty term and target penalty term are evaluated to be smaller relative to the control penalty term, so that a penalty due to a large separation from the subject H or from the target position G is evaluated to be smaller than a penalty due to a large temporal variation of the control command. Thus, when the prediction reliability γ is low, the mobile body 1 is allowed to be separated from the subject H or target position G and is brought into a moving state like coasting without largely changing the translational speed or angular speed, with the result that the mobile body 1 moves while waiting and seeing the subsequent movement of the subject H.

Further, when, for example, the basic trajectories 104 to 106 at straight traveling are acquired as the subject predicted trajectory 12, the prediction reliability γ is high until a far future time point, so that the weights of the subject penalty item and target penalty item are continuously evaluated to be large. Thus, the mobile body 1 moves so as to reduce the distance from the subject H or target position G. On the other hand, when, for example, the basic trajectories 101, 102, 108, and 109 at abrupt turning are acquired as the subject predicted trajectory 12, the prediction reliability γ becomes lower as time elapses, so that the weights of the subject penalty item and target penalty item are evaluated to be smaller toward the future. Thus, the mobile body 1 becomes lower in degree of accompanying the subject H as time elapses and gradually shifts to a state of waiting and seeing the subsequent movement of the subject H.

Simulation Analysis Results

The following describes simulation analysis results of a moving state of the robot R controlled by the mobile body control device 6.

Figure 7A:
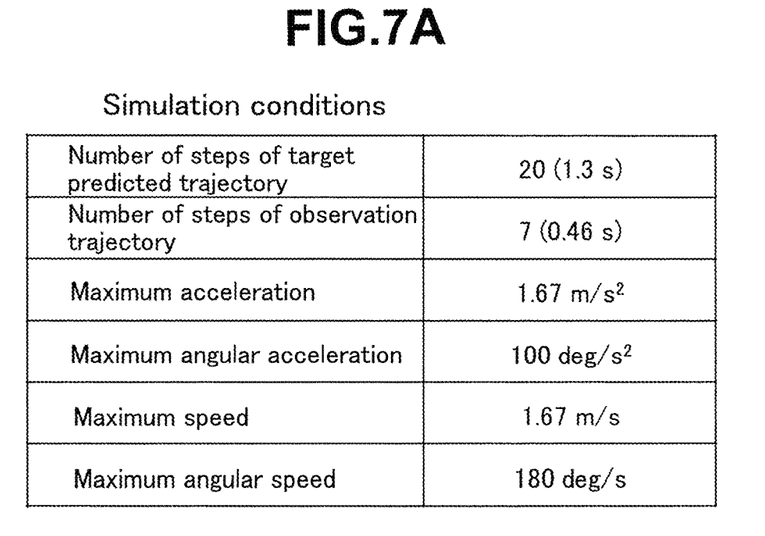
Figure 7B:
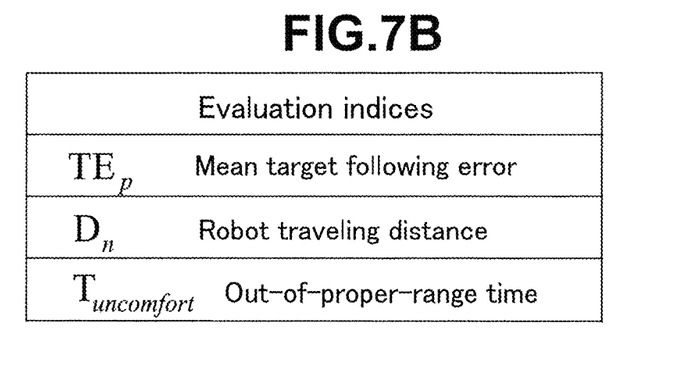
Figure 7C:
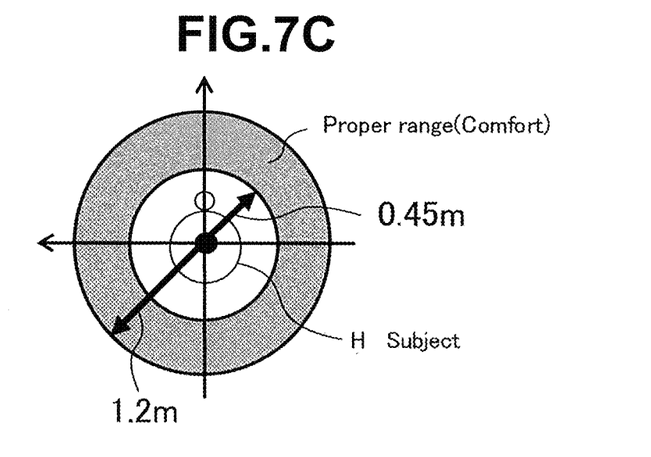

FIGS. 7A to 7C illustrate the outline of simulation, FIG. 7A illustrates simulation conditions, FIG. 7B illustrates evaluation indices, and FIG. 7C illustrates a proper range. The number of steps is counted with one period of the control period. Δt as one step. The evaluation indices include, as illustrated in FIG. 7B, a mean target following error $TE_P$, a total traveling distance $D_n$ of the robot R, and an out-of-proper-range time $T_{comfort}$. The proper range is, as illustrated in FIG. 7C, a range of 0.45 m to 1.2 m from the center (subject H), and the time during which the robot R exists outside the proper range is defined as the out-of-proper-range time $T_{comfort}$.

In the simulation, the following three cases are compared in terms of the evaluation index and control trajectory 14: (1) a case where the robot R is controlled without prediction of the movement of the subject H (without acquiring the subject predicted trajectory 12) and only with the detection result from the subject detection unit 4; (2) a case where the robot R is controlled with the movement of the subject H predicted but the uncertainty of prediction not taken into consideration (prediction reliability γ not acquired); and (3) a case where the robot R is controlled according to the configuration (functional block diagram illustrated in FIG. 4) of present disclosure. Further, in this simulation, it is assumed that the subject H walks in such a manner as to go straight and then makes a U-turn.

Figure 8A:
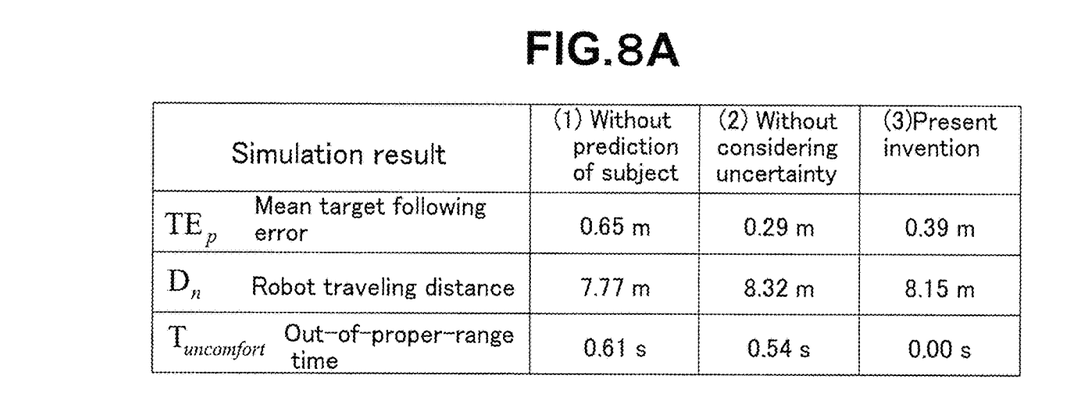
Figure 8B:
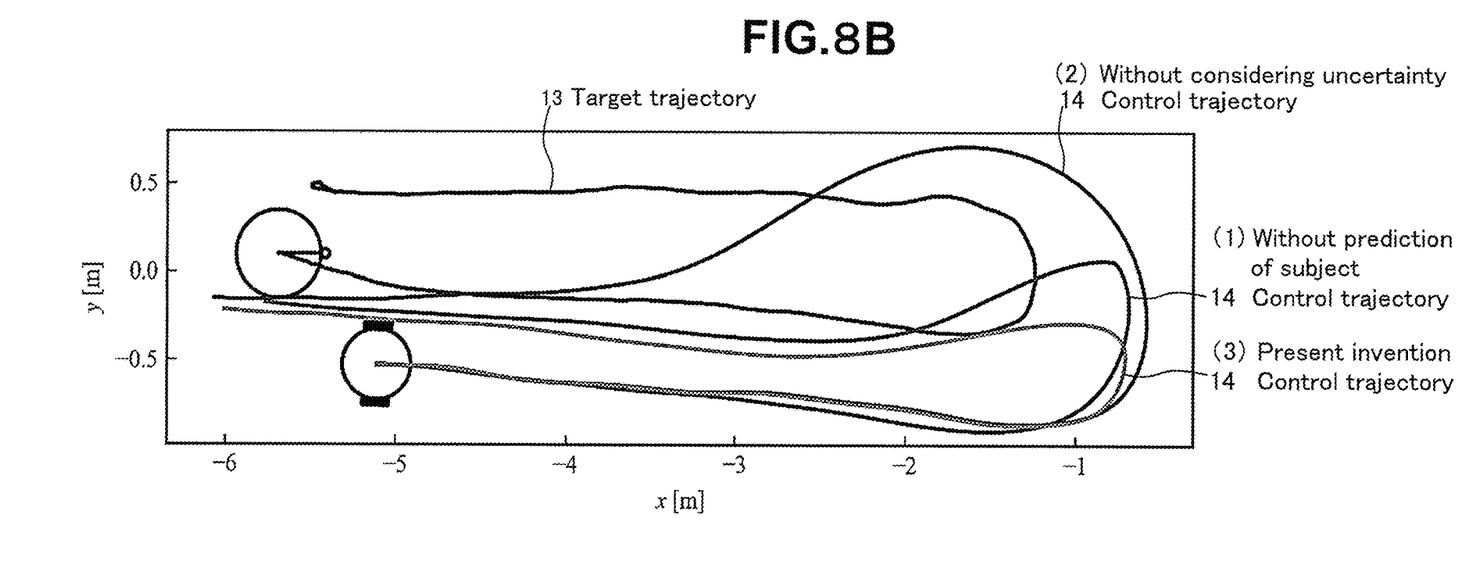

FIGS. 8A and 8B illustrate simulation analysis results. FIG. 8A illustrates comparison results of the evaluation indices, and FIG. 8B illustrates comparison result of the control trajectories As a result of comparison for the evaluation index illustrated in FIG. 8A, it is found that the mean target following error $TE_P$ is smaller the case (3) than in the case (1). This is considered an effect of reducing control delay due to prediction of the trajectory of the subject H.

Further, the total traveling distance $D_n$ of the robot R is smaller in the case (3) than in the case (2). That is, in the case (3), useless motion is reduced.

As a result of comparison for the control trajectory 14 illustrated in FIG. 8B, the frequency of abrupt acceleration/deceleration or abrupt turning, as well as delay are smaller in the case (3) than in the case (1). This is considered that, as described above, the robot R moves while and seeing the subsequent movement of the subject H by predicting the trajectory of the subject H, so that control delay reduces to result in accompanying control better suited to the movement of the subject H.

Further, when the subject H makes a U-turn, the robot R can move with less interference with the movement of the subject H in the case (3) than in the case (2). This is considered an effect of adequately switching the target position G of the robot R from the front right to front left in the traveling direction of the subject H at the U-turn.

Other Embodiments

While the embodiments of the present disclosure have been described, the present disclosure is not limited to the above embodiments, and various modifications may be made without departing from the technical concept of the present disclosure.

For example, the moving unit 5 of the mobile body 1 may have, for example, omni-wheels as the plurality of wheels 50. Further, in place of the plurality of wheels 50, a bipedal walking mechanism may be used.

Further, the mobile body control device 6 is included in the mobile body 1 in the above embodiment; however, when the mobile body control device 6 is configured to communicate various information with the mobile body 1, it may be included in a device separated from the mobile body 1.

Further, although the mobile body control program 604 is stored in the storage part 60 in the above embodiment, it may be provided in a state of being stored as a file of an installable format or an executable format in a computer-readable storage medium, such as a CD-ROM, DVD or the like. Further, the mobile body control program 604 may be stored in a computer connected to a network such as Internet and downloaded through a network.

REFERENCE SIGNS LIST

1: Mobile body (robot R)
2: Main body
3: Own position detection unit
4: Subject detection unfit
5: Moving unit
6: Mobile body control device
7: Power supply
11: Observation trajectory
12: Subject predicted trajectory
13: Target trajectory
14: Control trajectory
100: Specific basic trajectory
101 to 109: Basic trajectory
40: Detection range
50: Wheel
51: Electric motor
60: Storage part
61: Control part
62: Communication part
600: Mobile body information
601: Subject information
602: Basic trajectory group information
603: Setting information
604: Mobile body control program
610: Subject information acquisition unit
611: Observation trajectory acquisition unit
612: Basic trajectory acquisition unit
613: Subject predicted trajectory acquisition unit
614: Prediction reliability calculation unit
615: Target trajectory acquisition unit
616: Control-command-sequence-generating unit
617: Movement control unit
H: Subject

The invention claimed is:

1. A mobile body control device that controls a moving unit of a mobile body such that the mobile body moves accompanying a subject at a position ahead of the subject in a traveling direction thereof, the control device comprising:
a processor programmed to:
acquire subject information including the position and traveling direction of the subject;
process the subject information in time-series order to acquire, as an observation trajectory, a trajectory along which the subject has walked until a current time point;
acquire, from a plurality of basic trajectories which are trajectories along which a walker walks toward a plurality of different target points, each of the basic trajectories being added, along its trajectory, with an uncertainty that represents probability distribution deviating from the trajectory, the basic trajectory that matches the observation trajectory as a specific basic trajectory;
acquire from the specific basic trajectory, as a subject predicted trajectory, a trajectory along which the subject walks after the current time point so as to follow the observation trajectory;
calculate, based on the uncertainty added along the subject predicted trajectory, prediction reliability of prediction that the subject walks following the subject predicted trajectory along the subject predicted trajectory;

acquire, as a target trajectory, a trajectory formed by a target position of the mobile body set ahead of the subject in the traveling direction when it is assumed that the subject walks following the subject predicted trajectory;

generate a control command sequence using an evaluation function that uses as input the subject predicted trajectory, prediction reliability, target trajectory, and a control trajectory obtained when the mobile body moves according to the control command sequence in time-series order, the evaluation function adding a control penalty term for the control command sequence, a subject penalty term based on a distance between the subject predicted trajectory and control trajectory, and a target penalty term based on a distance between the target trajectory and control trajectory and multiplies the prediction reliability as a coefficient with the subject penalty term and target penalty term to calculate the evaluation value, the control command sequence being generated so as to minimize the evaluation value; and control the moving unit based on the control command sequence.

2. The mobile body control device according to claim 1, wherein the processor is programmed to:

calculate a matching degree between the plurality of basic trajectories and the observation trajectory; and synthesize the plurality of basic trajectory based on the matching degree with respect to the observation trajectory to acquire the specific basic trajectory.

3. The mobile body control device according to claim 1, wherein the higher a turning angle of the basic trajectory is, the larger the uncertainty is set for the basic trajectory, and the more a time axis in the basic trajectory advances, the larger the uncertainty is set for the basic trajectory.

4. The mobile body control device according to claim 1, wherein the processor is programmed to:

select one of a front left or a front right of the subject in the traveling direction based on mobile body information including the position and traveling direction of the mobile body and subject information; and acquire, as the target trajectory, a trajectory formed by the target position.

5. A non-transitory computer-readable medium storing a mobile body control program that causes a computer to perform functions comprising:

acquiring subject information including a position and traveling direction of the subject;

processing the subject information in time-series order to acquire, as an observation trajectory, a trajectory along which the subject has walked until a current time point;

acquiring, from a plurality of basic trajectories which are trajectories along which a walker walks toward a plurality of different target points, each of the basic trajectories being added, along its trajectory, with an uncertainty that represents probability distribution deviating from the trajectory, the basic trajectory that matches the observation trajectory as a specific basic trajectory;

acquiring from the specific basic trajectory, as a subject predicted trajectory, a trajectory along which the subject walks after the current time point so as to follow the observation trajectory;

calculating, based on the uncertainty added along the subject predicted trajectory, prediction reliability of prediction that the subject walks following the subject predicted trajectory along the subject predicted trajectory;

acquiring, as a target trajectory, a trajectory formed by a target position of the mobile body set ahead of the subject in the traveling direction when it is assumed that the subject walks following the subject predicted trajectory;

generating a control command sequence using an evaluation function that uses as input the subject predicted trajectory, prediction reliability, target trajectory, and a control trajectory obtained when the mobile body moves according to the control command sequence in time-series order, the evaluation function adding a control penalty term for the control command sequence, a subject penalty term based on a distance between the subject predicted trajectory and control trajectory, and a target penalty term based on a distance between the target trajectory and control trajectory and multiplies the prediction reliability as a coefficient with the subject penalty term and target penalty term to calculate the evaluation value, the control command sequence being generated so as to minimize the evaluation value; and controlling a moving unit based on the control command sequence.

6. A mobile body comprising the mobile body control device according to in claim 1.

* * * * *